United States Patent
Huang et al.

(10) Patent No.: US 9,709,240 B2
(45) Date of Patent: Jul. 18, 2017

(54) LAMP

(71) Applicant: Radiant Opto-Electronics Corporation, Kaohsiung (TW)

(72) Inventors: Guo-Hao Huang, Kaohsiung (TW); Kun-Feng Chen, Kaohsiung (TW); Pen-Jan Wang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 173 days.

(21) Appl. No.: 14/667,700

(22) Filed: Mar. 25, 2015

(65) Prior Publication Data

US 2015/0277030 A1    Oct. 1, 2015

(30) Foreign Application Priority Data

Mar. 31, 2014 (TW) ............... 103111975 A
Jan. 9, 2015 (TW) ............... 104100779 A

(51) Int. Cl.
*F21V 3/04* (2006.01)
*F21S 8/06* (2006.01)
*F21V 8/00* (2006.01)

(52) U.S. Cl.
CPC ............... *F21V 3/04* (2013.01); *F21S 8/061* (2013.01); *G02B 6/0091* (2013.01); *G02B 6/0078* (2013.01)

(58) Field of Classification Search
CPC .......... F21S 8/061; F21V 3/04; G02B 6/0078; G02B 6/0091
USPC ......................................... 362/605, 612, 806
See application file for complete search history.

(56) References Cited

U.S. PATENT DOCUMENTS

| | | | |
|---|---|---|---|
| 7,222,988 B2 | 5/2007 | Gober | |
| 7,988,322 B2 * | 8/2011 | Zheng | ............ F21V 5/00 362/218 |
| 8,487,518 B2 | 7/2013 | Johnston et al. | |
| 8,957,597 B2 | 2/2015 | Lin et al. | |
| 2006/0007692 A1 | 1/2006 | Hsien | |
| 2010/0073960 A1 | 3/2010 | Yang | |
| 2010/0085737 A1 | 4/2010 | Yang | |
| 2011/0291560 A1 | 12/2011 | Wang et al. | |
| 2011/0309735 A1 | 12/2011 | Parker et al. | |
| 2013/0038195 A1 | 2/2013 | Petroski et al. | |
| 2013/0265754 A1 | 10/2013 | Tsai et al. | |
| 2014/0092580 A1 | 4/2014 | McCollum et al. | |

FOREIGN PATENT DOCUMENTS

| | | |
|---|---|---|
| CN | 201289044 Y | 8/2009 |
| CN | 201696900 U | 1/2011 |
| CN | 102052623 A | 5/2011 |
| CN | 202613256 U | 12/2012 |
| CN | 203036387 U | 7/2013 |

(Continued)

*Primary Examiner* — Stephen F Husar
(74) *Attorney, Agent, or Firm* — CKC & Partners Co., Ltd.

(57) ABSTRACT

A lamp includes a frame, a light source, a light guide unit and a decorative unit. The light source is disposed on the frame. The light guide unit has a light-incident surface and a light-emitting surface. The light-incident surface faces towards the light source, and light emitted from the light source enters the light guide unit from the light-incident surface and is emitted out from the light-emitting surface to form a light plane. The decorative unit is detachably disposed on a position different from the light plane.

18 Claims, 11 Drawing Sheets

(56) References Cited

FOREIGN PATENT DOCUMENTS

| | | |
|---|---|---|
| CN | 103322442 A | 9/2013 |
| CN | 203190245 U | 9/2013 |
| CN | 203202768 U | 9/2013 |
| CN | 103335277 A | 10/2013 |
| CN | 203348957 U | 12/2013 |
| CN | 103574516 A | 2/2014 |
| EP | 2679896 A1 | 1/2014 |
| JP | 2010250966 A | 11/2010 |
| TW | 454851 | 9/2001 |
| TW | M404310 | 5/2011 |
| TW | M481330 U | 7/2014 |
| WO | 98/55798 A2 | 12/1998 |
| WO | 2013/013514 A1 | 1/2013 |
| WO | 2013/023022 A2 | 2/2013 |
| WO | 2013/190979 A1 | 12/2013 |
| WO | 2014/138163 A1 | 9/2014 |

* cited by examiner

LAMP

RELATED APPLICATIONS

This application claims priorities to Taiwan Application Serial Number 104100779, filed Jan. 9, 2015 and Taiwan Application Serial Number 103111975, filed Mar. 31, 2014, which are herein incorporated by references.

BACKGROUND

Field of Invention

The present invention relates to an illuminating device. More particularly, the present invention relates to a lamp with externally-added decorative members.

Description of Related Art

Lamps become more diversified to meet market requirements. For the lamps on the market nowadays, in addition to the lighting function, their shapes and appearances have become one of the reasons considered by consumers for purchasing.

However, while there are different types of lamps on the market, their shapes and appearances are fixed and do not have uniqueness, and thus fail to match with various styles of interior design. On the other hand, although customized lamps may have unique styles, yet their fabrication costs are too high and they do not have the flexibility of changes.

SUMMARY

One object of the present invention is to provide a lamp of which the appearance can be varied according to user requirements, so as to meet multiple user requirements.

According to the aforementioned object, a lamp is provided. The lamp includes a frame, a light source, a light guide unit and a decorative unit. The light source is disposed on the frame. The light guide unit has a light-incident surface and a light-emitting surface. The light-incident surface faces towards the light source, and light emitted from the light source enters the light guide unit from the light-incident surface and is emitted out from the light-emitting surface to form a light plane. The decorative unit is detachably disposed on a position different from the light plane.

According to an embodiment of the present invention, at least one fastener is engaged with the frame. The fastener has a connecting member, and the decorative unit is fixed on the connecting member.

According to an embodiment of the present invention, the frame has an extension structure, and the fastener has an engaging portion which is elastically engaged with the extension structure.

According to an embodiment of the present invention, the frame has an extension structure and a side all. The fastener further comprises a hook portion, an extending wall and an abutting member. The hook portion and the extending wall are respectively located at two opposite sides of the fastener. The hook portion is correspondingly engaged with the extension structure. The abutting member passes through the extending wall and abuts against the side all of the frame.

According to an embodiment of the present invention, the connecting member comprises a rod and a positioning member. The decorative unit is connected to the rod, and the positioning member is disposed on the rod to fix the decorative unit.

According to an embodiment of the present invention, the frame has a first side and a second side opposite to the first side. The light source and the fastener are respectively disposed on the first side and the second side.

According to an embodiment of the present invention, the frame is an annular structure with a central hollow portion. The first side is adjacent to the central hollow portion. The second side is located away from the central hollow portion. The decorative unit is disposed in the central hollow portion.

According to an embodiment of the present invention, the frame is an annular structure with a central hollow portion. The first side is located away from the central hollow portion. The second side is adjacent to the central hollow portion. The light guide unit is disposed in the central hollow portion.

According to an embodiment of the present invention, the frame further has an accommodating space located at the first side, and the light source is disposed in the accommodating space.

According to an embodiment of the present invention, a side of the light guide unit near the light-incident surface is located in the accommodating space.

According to an embodiment of the present invention, the light guide unit comprises a plurality of light guide plates which are mutually connected.

According to an embodiment of the present invention, a plurality of indicating portions are disposed on the frame.

According to the aforementioned object, another lamp is provided. The lamp includes a frame, a light source, a light guide unit and a decorative unit. The light source is disposed on the frame. The light guide unit has a light-incident surface and a light-emitting surface. The light-incident surface faces towards the light source, and light emitted from the light source enters the light guide unit from the light-incident surface and is emitted out from the light-emitting surface. The decorative unit is detachably disposed, in which the material of the decorative unit is different from the material of the light guide unit.

According to the aforementioned object, another lamp is provided. The lamp includes a frame, a light source, a light guide unit and a decorative unit. The light source is disposed on the frame. The light guide unit comprises a plurality of light guide plates mutually connected, in which the light guide unit has a light-incident surface and a light-emitting surface. Light emitted from the light source enters the light guide unit from the light-incident surface and is emitted out from the light-emitting surface. The decorative unit is detachably disposed on a position for maintaining a light-emitting feature of the lamp.

According to the above embodiments, the lamp achieves an object of decoration by using the fastener to fix the decorative unit on the frame. In addition, the fastener can be elastically engaged with the frame by using its elasticity, or the fastener can be tightly engaged with the frame by using the abutting member. Therefore, the fastener can be rapidly dismantled from the frame or the position of the fastener can be adjusted, so as to quickly change different decorative units to form the lamps with different styles.

According to the above embodiments, the structure of the lamp is simple and can be easily assembled, such the lamp appearance can be varied to meet various requirements of users and increase added value of lamps.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
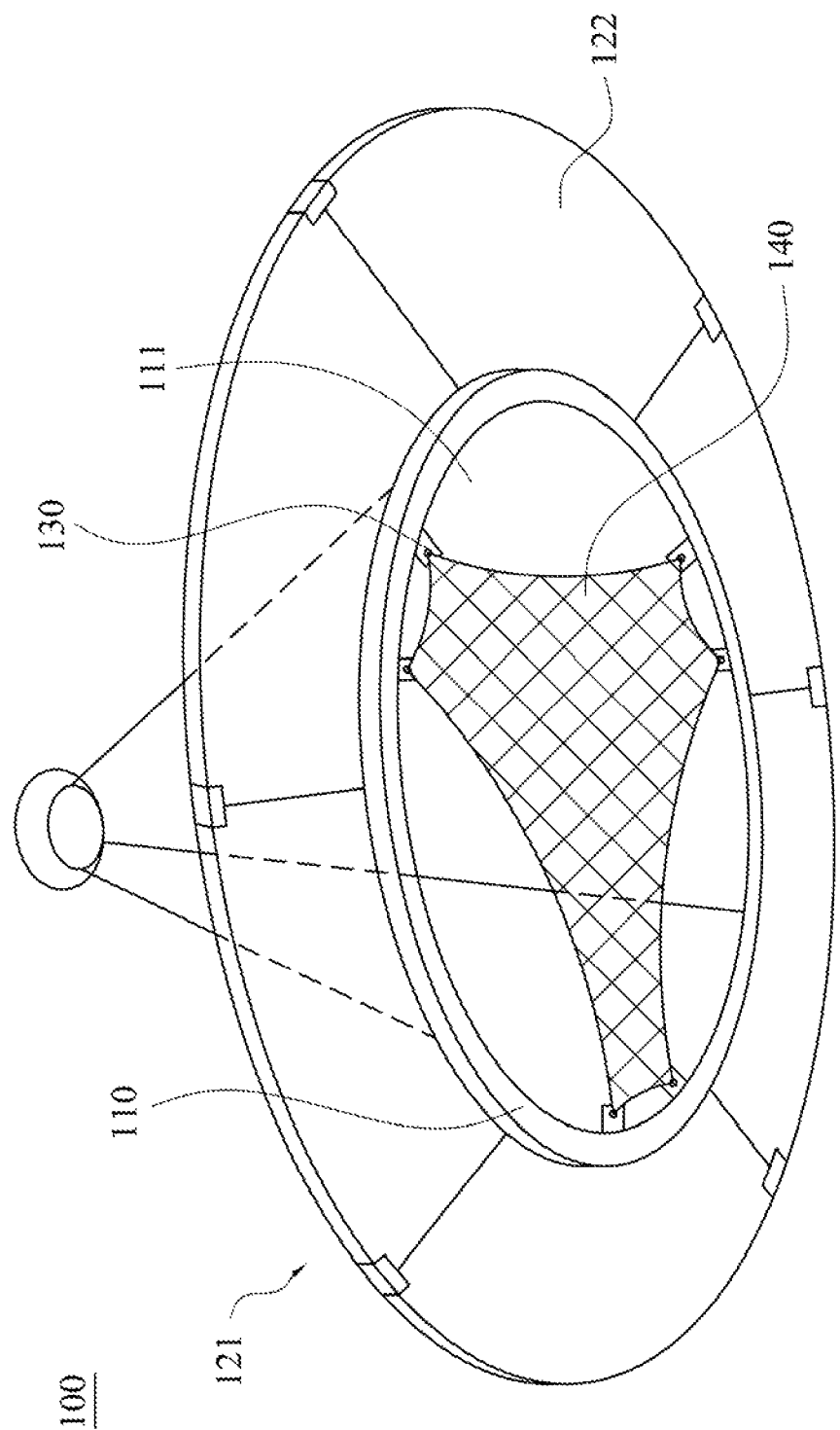
FIG. 1 is a schematic structural diagram showing a lamp in accordance with a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
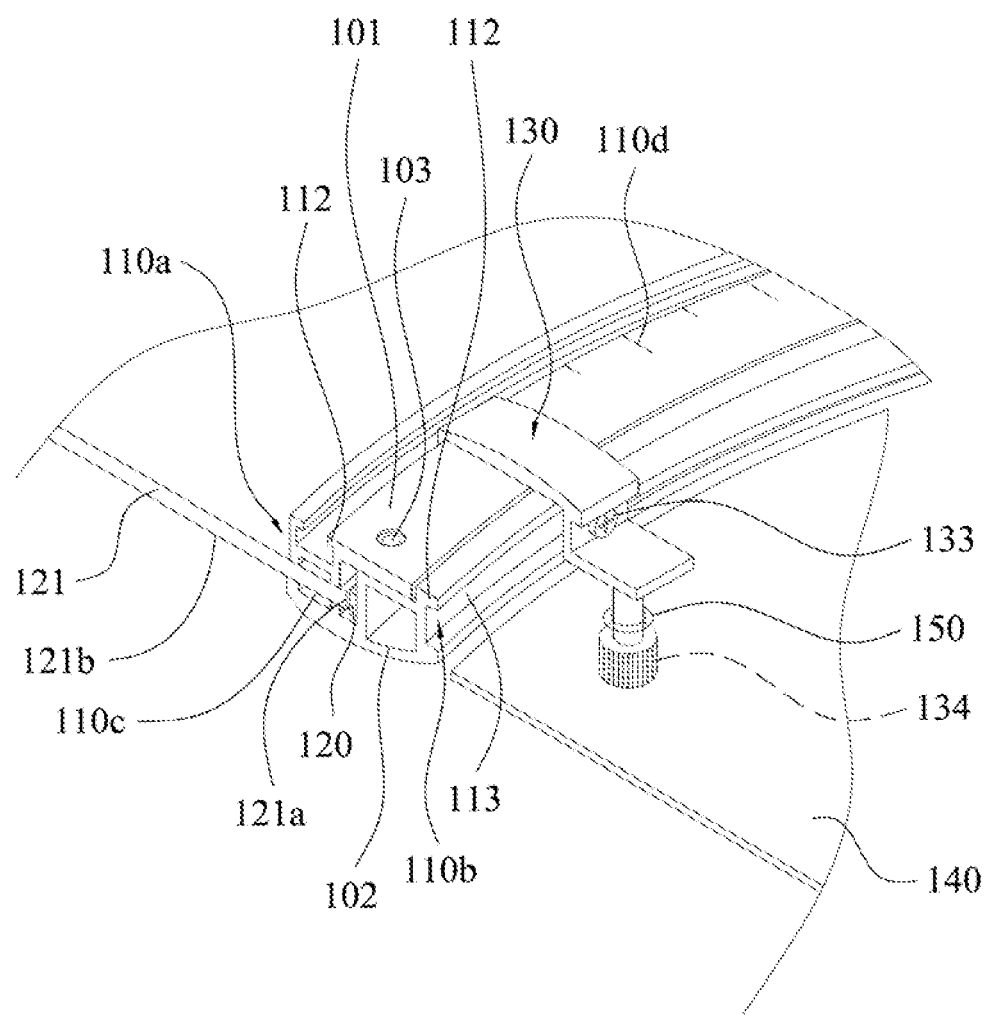
FIG. 2 is a schematic partial structural diagram showing the lamp in accordance with the first embodiment of the present invention.
Figure 3:
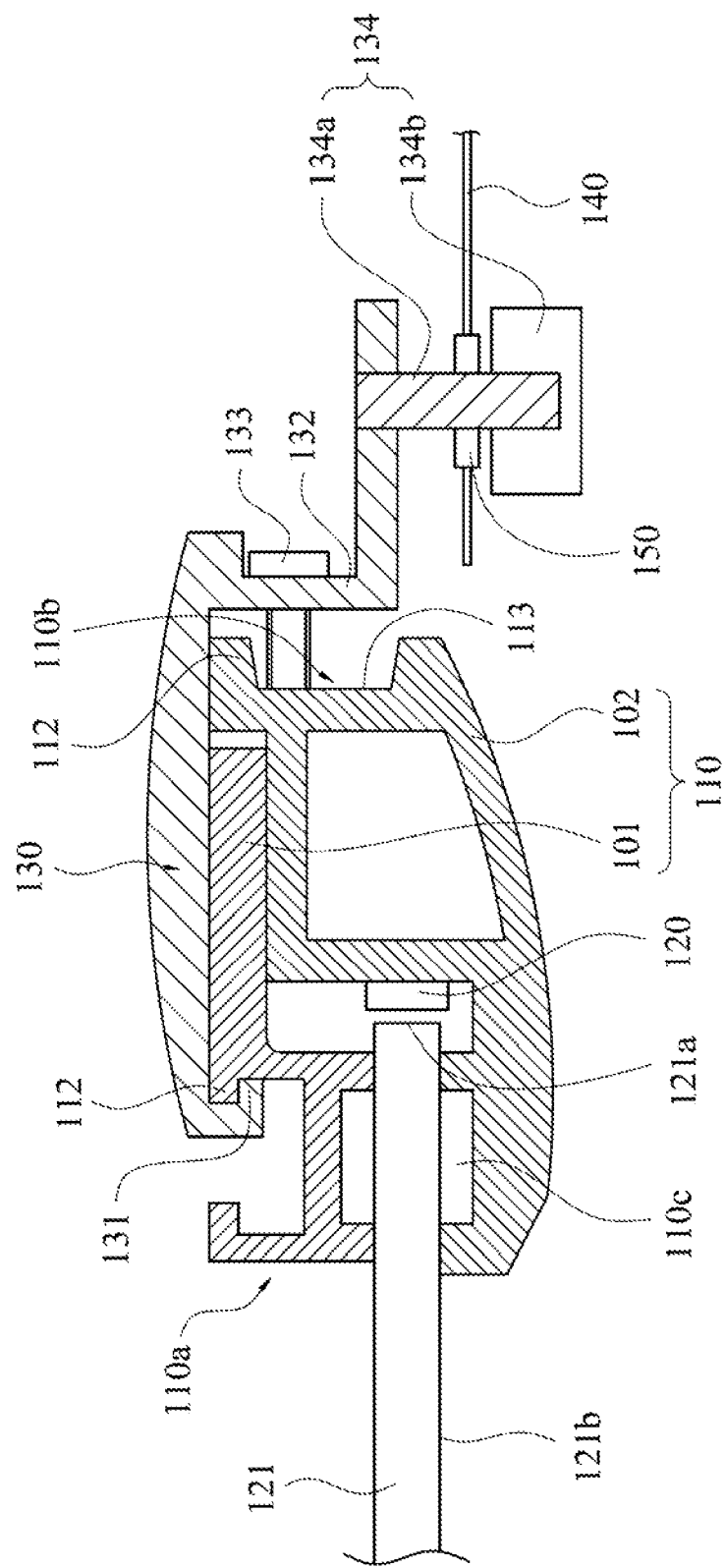
FIG. 3 is a partial cross-sectional view showing the lamp in accordance with the first embodiment of the present invention.

Referring to FIG. 1 to FIG. 3, FIG. 1 to FIG. 3 are a schematic structural diagram, a schematic partial structural diagram and a partial cross-sectional view showing a lamp 100 in accordance with a first embodiment of the present invention. In the present embodiment, the lamp 100 includes a frame 110, a light source 120, a light guide unit 121, at least one fastener 130 and at least one decorative unit 140. The decorative unit 140 is fixed on the frame 110 via the fastener 130, so that the appearance of the lamp 100 can be varied by changing the position of the fastener 130 and the type of decorative unit 140, thereby achieving the effect of embellishing the lamp 100.

Figure 4:
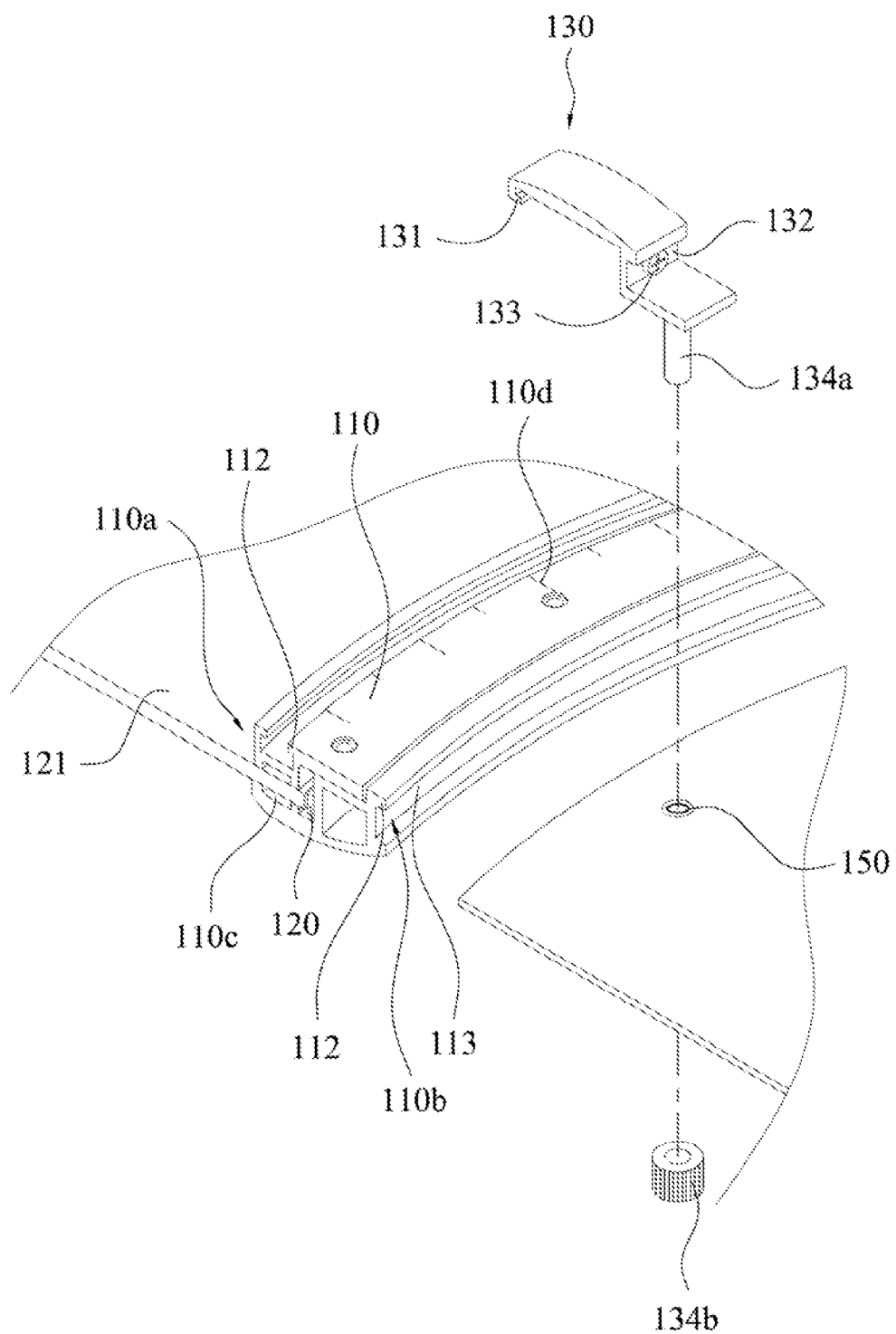
FIG. 4 is a schematic exploded view showing the lamp in accordance with the first embodiment of the present invention.

Referring to FIG. 2 to FIG. 4. FIG. 4 is a schematic exploded view showing the lamp 100 in accordance with the first embodiment of the present invention. In the present embodiment, the frame 110 has a first side 110a and a second side 110b opposite to each other. The light source 120 and the light guide unit 121 are disposed on the first side 110a, and the fastener 130 is disposed on the second side 110b. In some embodiments, as shown in FIG. 2, the frame 110 has an accommodating space 110c located at the first side 110a, and the light source 120 is disposed in the accommodating space 110c. In addition, as shown in FIG. 3, the light guide unit 121 has a light-incident surface 121a and a light-emitting surface 121b, and a side of the light guide unit 121 near the light-incident surface 121a is located in the accommodating space 110c. Therefore light emitted from the light source 120 can enter the light guide unit 121 from the light-incident surface 121a and be emitted out from the light-emitting surface 121b to form a light plane. Moreover, when the decorative unit 140 is fixed on the frame 110 via the fastener 130, the decorative unit 140 is located at a position different from the light plane, so as to maintaining the light-emitting feature of the lamp 100. In other words, the decorating unit 140 is detachable and is mechanically disposed for decorating the lamp. The meaning of "mechanically" is to maintain the original light-emitting feature without changing at least one of a wavelength, an output angle and a light field and so forth of the light emitted from the light-emitting surface 121b of the light guide unit 121.

As shown in FIG. 2 and FIG. 3, in one embodiment, the frame 100 includes a frame body 101 and a frame body 102. Moreover, the frame body 101 and the frame body 102 are combined together via screws 103 to form the accommodating space 110c. Accordingly, the combination of the frame body 101 and the frame body 102 also can clamp the light guide unit 121. In some embodiments, the frame body 101 and the frame body 102 can be combined together in different manners, for example, by soldering. In other embodiments, the frame 110 is an integrally-formed structure.

Referring to FIG. 2 to FIG. 4 again, the frame 110 further includes an extension structure 112 and a sidewall 113. In the present embodiment, the extension structure 112 is a structure extending from top surfaces of the frame body 101 and the frame body 102 respectively towards the first side 110a and the second side 110b, and the sidewall 113 is located at the second side 110b of the frame 110. In addition, as shown in FIG. 3, the fastener 130 is an inverted-U structure which can be disposed across the frame, so that the fastener 130 can slide along the extension structure 112 of the frame 110 used as a track. As shown in FIG. 3 and FIG. 4, the fastener 130 mainly includes a hook portion 131, an extending wall 132, an abutting member 133 and a connecting member 134. The hook portion 131 and the extending wall 132 are respectively disposed on the opposite two sides of the fastener 130. Moreover, the hook portion 131 is correspondingly engaged with the extension structure 112 of the frame 110, and the abutting member 133 is screwed into the extending wall 132 and abuts against the sidewall 113 of the frame 110. Accordingly, when the abutting member 133 is rotated, the fastener 130 will be pulled by the force generated from the abutting member 133 resisting the sidewall 113, so that the hook portion 131 can be tightly engaged with the extension structure 112, thereby enabling the fastener 130 to be fixed on the frame 110.

In some embodiments, the abutting member 133 can be a flat head screw. Therefore, the fastener 130 can slide to a desired position on the frame 110 along the frame 110 when the abutting member 133 is loosened, and can be fixed on the desired position by tightening the abutting member 133. As shown in FIG. 2 and FIG. 4, in some embodiments, the frame 110 can be implemented with plural indicating portions 110d. In some examples, the indicating portions 110d are indicating lines printed on the frame 110, or grooves carved on the frame 110. Therefore, the fastener 130 can slide along the frame 110 to the desired position indicated by the indicating portions 110d.

As shown in FIG. 2 to FIG. 4, in the present embodiments, the connecting member 134 is connected with the extending wall 132, and the connecting member 134 includes a rod 134a and a positioning member 134b. Therefore, the decorative unit 140 can be disposed on the rod 134a and fixed on the rod 134*a* via the positioning member 134*b* in the embodiment shown in the FIG. 2 to FIG. 4, the decorative unit 140 is fabric. Moreover, before the fabric is disposed on the rod 134*a*, a buckle 150 can be installed in a hole of the fabric for allowing the fabric to be stably fixed on the rod 134*a*.

In other embodiments, the decorative unit 140 can be a rope, a plate, a hanging member or another decorative member with different material from that of the light guide unit 121. The position of the decorative unit 140 is lower than light guide unit 121, and the decorative unit 140 is not located at the light plane of the light guide unit 121. In addition, the material of the decorative unit 140 is different from the light guide unit 121, which will not affect the light-emitting feature of the lamp 100.

Figure 5:
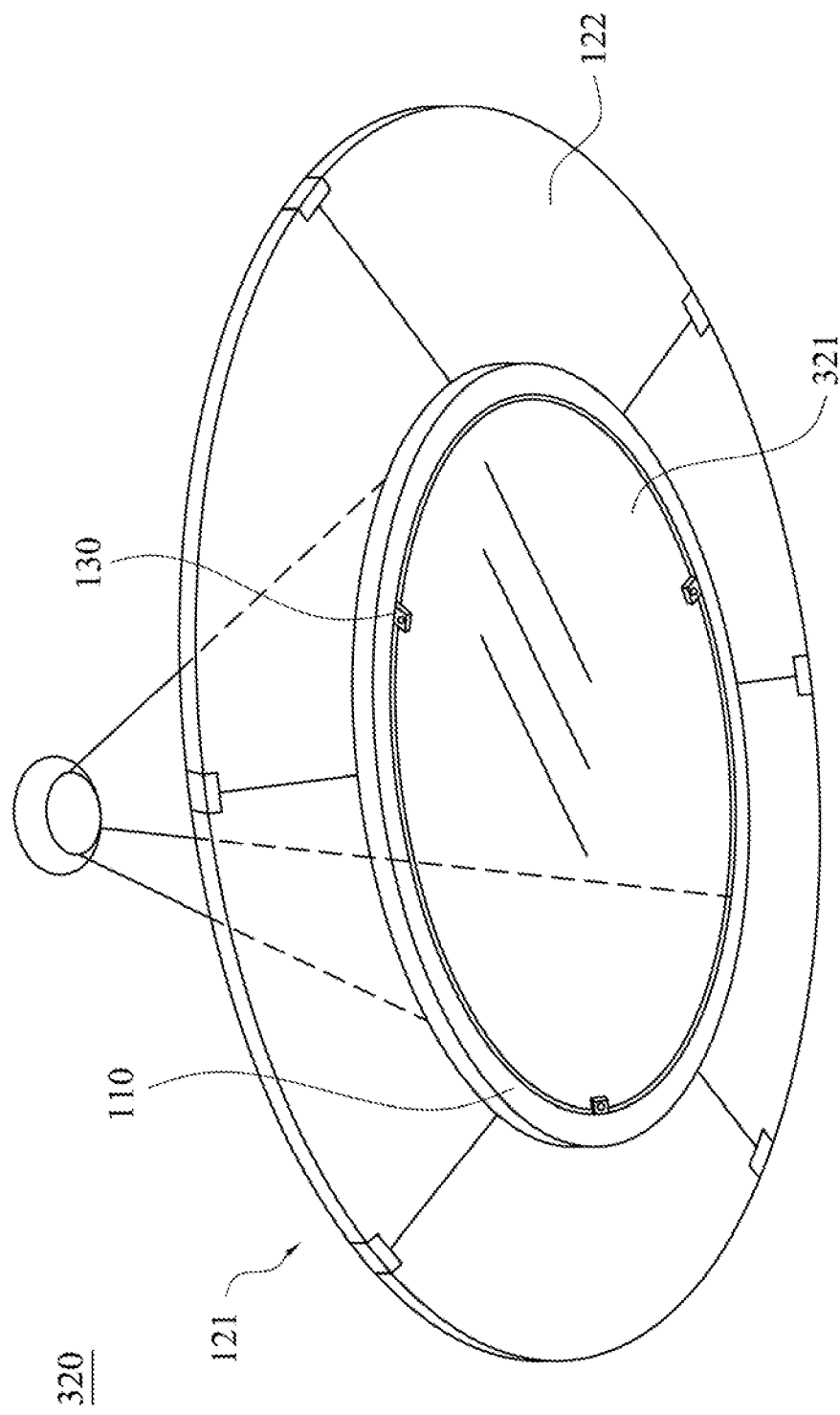
FIG. 5 is a schematic structural diagram showing a lamp in accordance with a second embodiment of the present invention.

In the present invention, the decorative unit 140 may have a different design. Referring to FIG. 5, FIG. 5 is a schematic structural diagram showing a lamp 320 in accordance with a second embodiment of the present invention. The structure of the lamp 320 shown in FIG. 5 is similar to that of the lamp 100 shown in FIG. 1, and the main difference therebetween is that a decorative unit 321 of the lamp 320 is a plate. In some examples, the plate can be made of transparent material, and the plate has a patterned surface formed by printing or machining, so as to embellish the appearance of the lamp 320.

Figure 6:
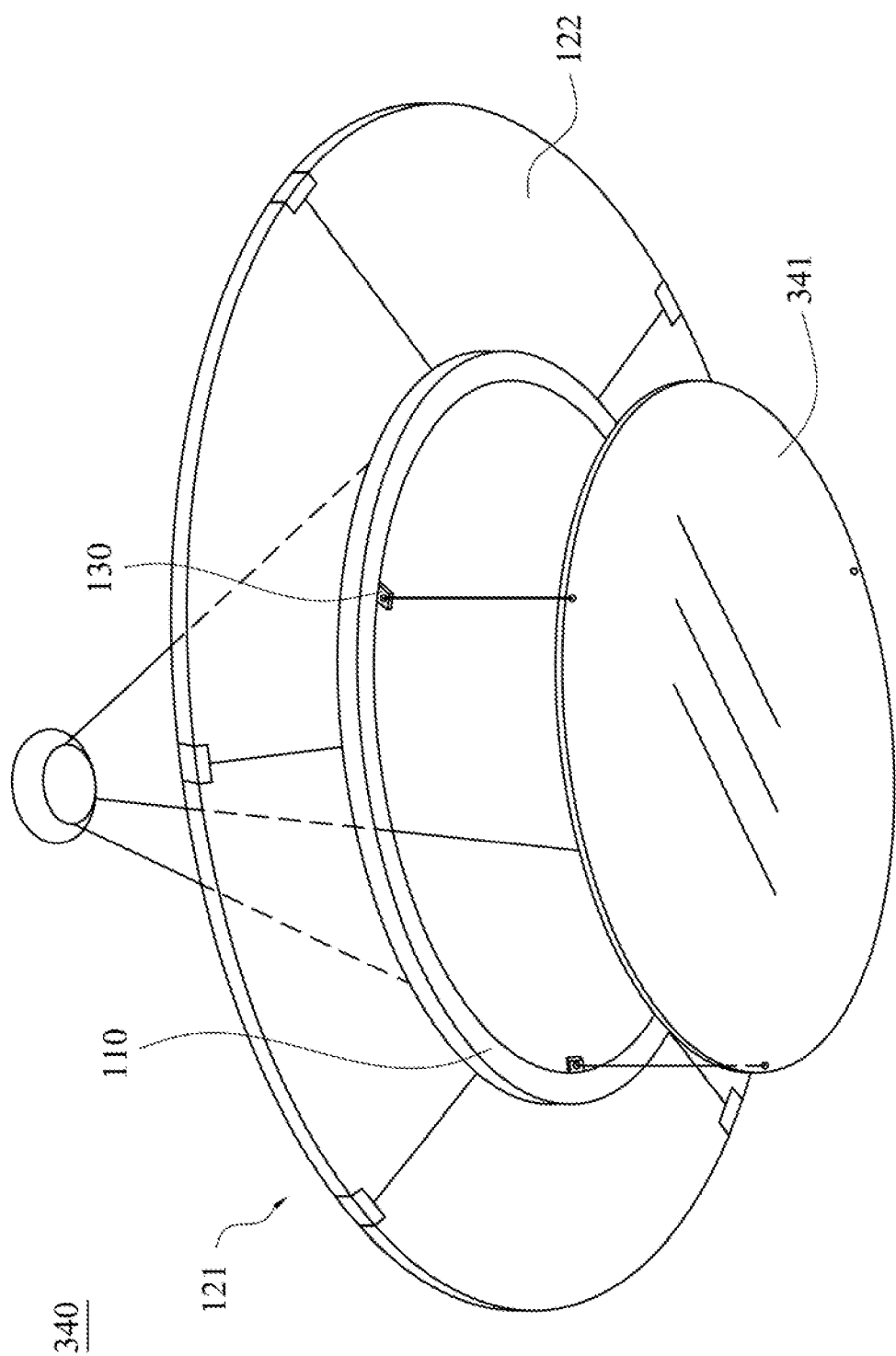
FIG. 6 is a schematic structural diagram showing a lamp in accordance with a third embodiment of the present invention.

In addition, the decorative unit 321 may have different designs. Referring to FIG. 6, FIG. 6 is a schematic structural diagram showing a lamp 340 in accordance with a third embodiment of the present invention. The structure of the lamp 340 shown in FIG. 6 is similar to that of the aforementioned lamp 320, and a decorative unit 341 of the lamp 340 is also a plate, in which the main difference therebetween is that the decorative unit 341 is suspended from the frame 110. In other words, the position of the plate is lower than that of the light guide unit 121, so as to embellish the appearance of the lamp 320.

In some embodiments, as show in FIG. 1 and FIG. 2, the frame 110 is an annular structure with a central hollow portion 111. Moreover, as shown in FIG. 1, the light guide unit 121 includes plural light guide plates 122 which are mutually connected to form the annular structure. In other embodiments, the light guide unit 121 is an integrally-formed annular structure. In one embodiment, the light source 120 and the light guide unit 121 are disposed on one side of the frame 110 away from the central hollow portion 111 (such as the first side 110*a* shown in FIG. 2), and the fastener 130 is disposed at the other side of the frame 110 near the central hollow portion 111 (such as the second side 110*b* shown in FIG. 2). In other words, the light source 120 may emit light towards an outer side of the frame 110, and the decorative unit 140 is located in the central hollow portion 111. It is noted that, the embodiment shown in FIG. 1 showing that the number of the fasteners 130 is six and each corner of the decorative unit 140 which is fixed on the fastener, is merely used as an example for explanation, and other embodiments of the present invention are not limited thereto. In other embodiments, the number and the position of the fasteners 130, or the type and shape of the decorative units 140 can be varied according to the practical requirements, so as to achieve different visual effects.

Figure 7:
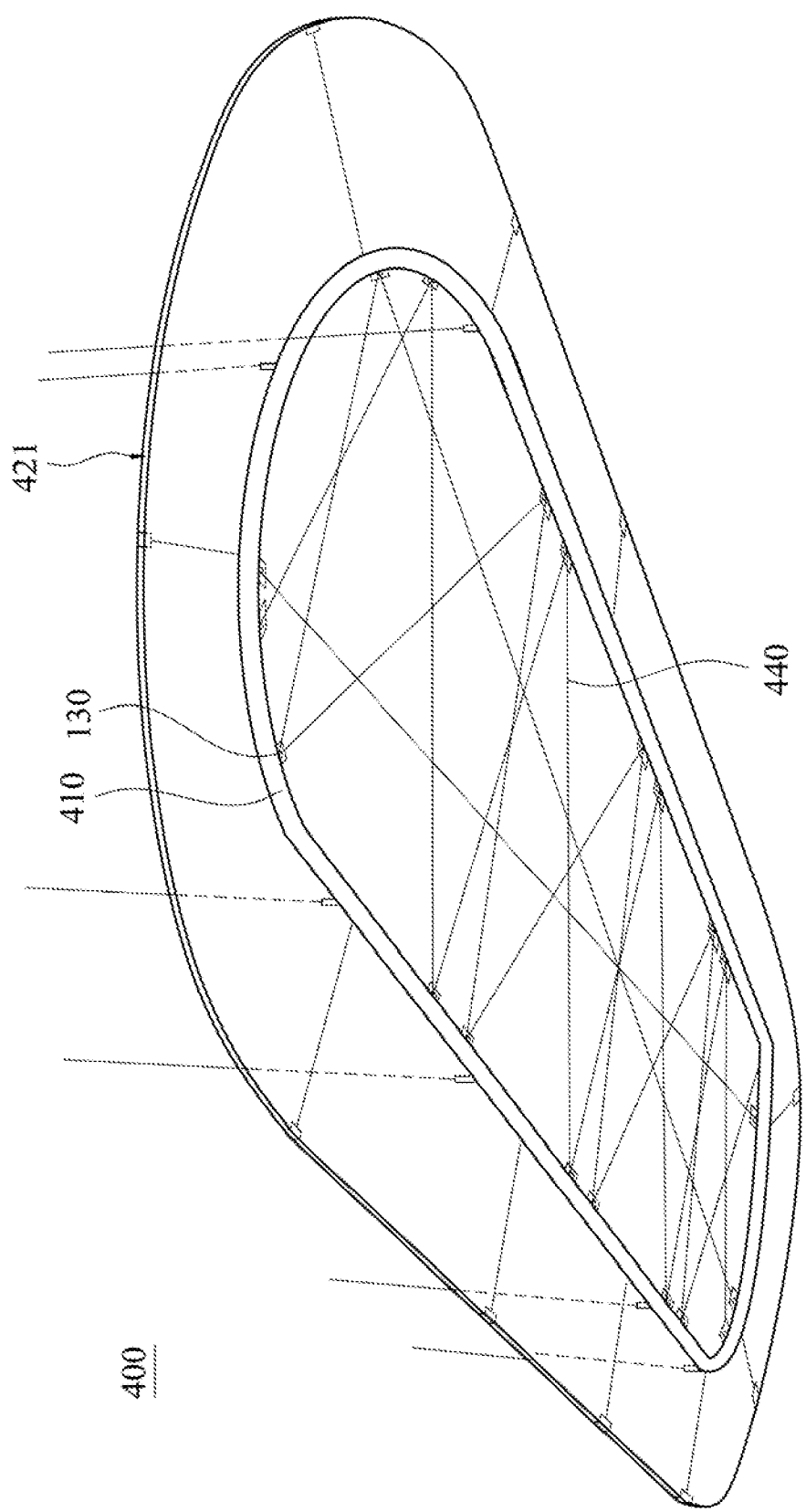
FIG. 7 is a schematic structural diagram showing a lamp in accordance with a fourth embodiment of the present invention.

As shown in FIG. 1, the frame 110 is the annular structure. In other embodiments, the frame may have a different shape structure other than the shape shown in previous embodiments. Referring to FIG. 7, FIG. 7 is a schematic structural diagram showing a lamp 400 in accordance with a fourth embodiment of the present invention. The structure of the lamp 400 shown in FIG. 7 is similar to that of the aforementioned lamp 100, and the main differences therebetween are that, a frame 410 and a light guide unit 421 of the lamp 400 are track field-shaped annular structures, and a decorative unit 440 of the lamp 400 is a rope. In one embodiment, the rope can be fixed on the frame 410 via the fastener 130.

Figure 8:
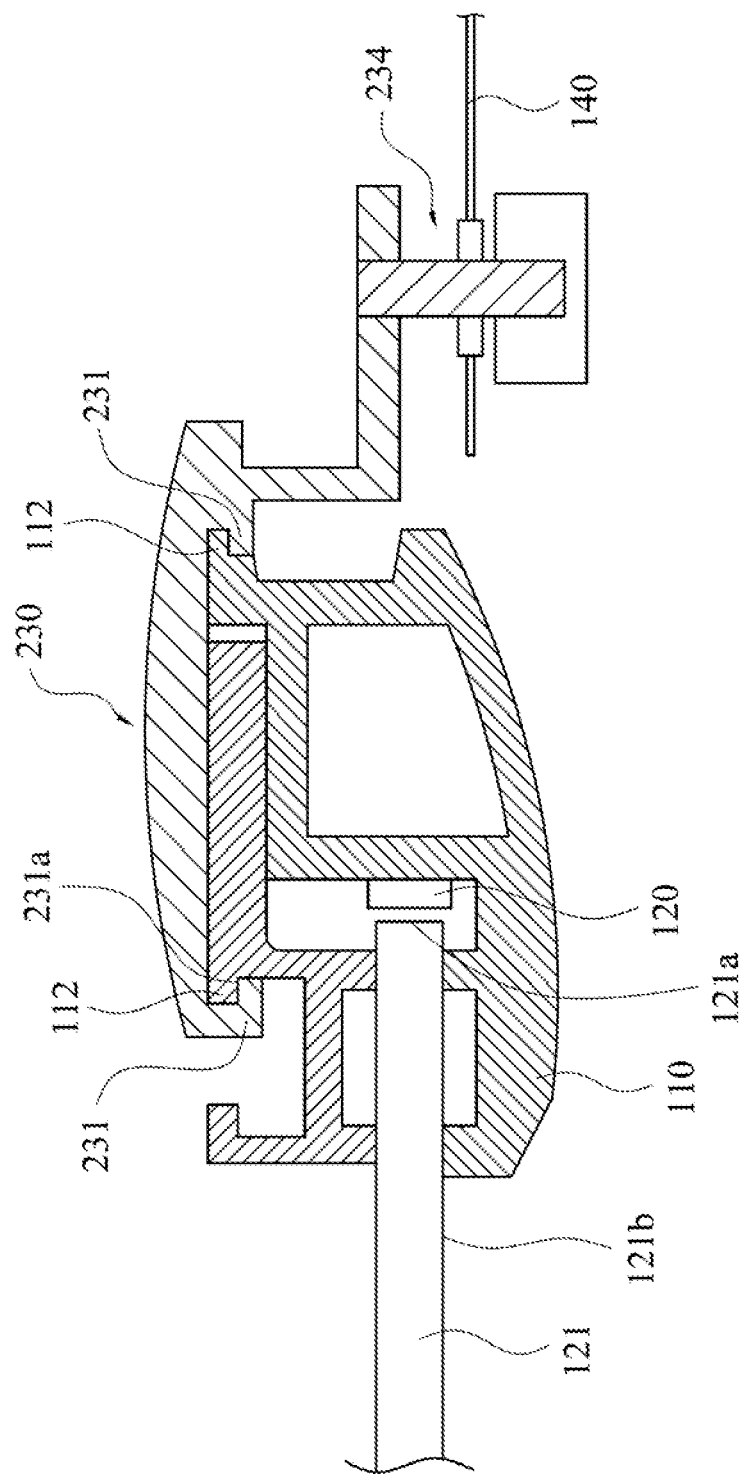
FIG. 8 is a partial cross-sectional view showing a lamp in accordance with the fifth embodiment of the present invention.

In the present invention, the fastener 130 may have different designs. Referring to FIG. 8, FIG. 8 is a partial cross-sectional view showing a lamp in accordance with the fifth embodiment of the present invention. A fastener 230 shown in FIG. 8 is similar to the aforementioned fastener 130, and the main difference therebetween is that the fastener 230 does not have the aforementioned abutting member 133. As shown in FIG. 8, the fastener 230 mainly includes two opposite hook portions 231 corresponding to the extension structure 112 of the frame 110, and there is an engaging portion 231*a* located between the two hook portions 231. In some embodiments, the fastener 230 itself is elastic, such as a plastic member. Therefore, fastener 230 can be fixed on the frame 110 by engaging the engaging portion 231*a* and the extension structure 112. In addition, the fastener 230 also includes a connecting member 234 which can be used to fix the decorative unit 140, so as to achieve the same objects described before, and will not be described again herein.

Figure 9:
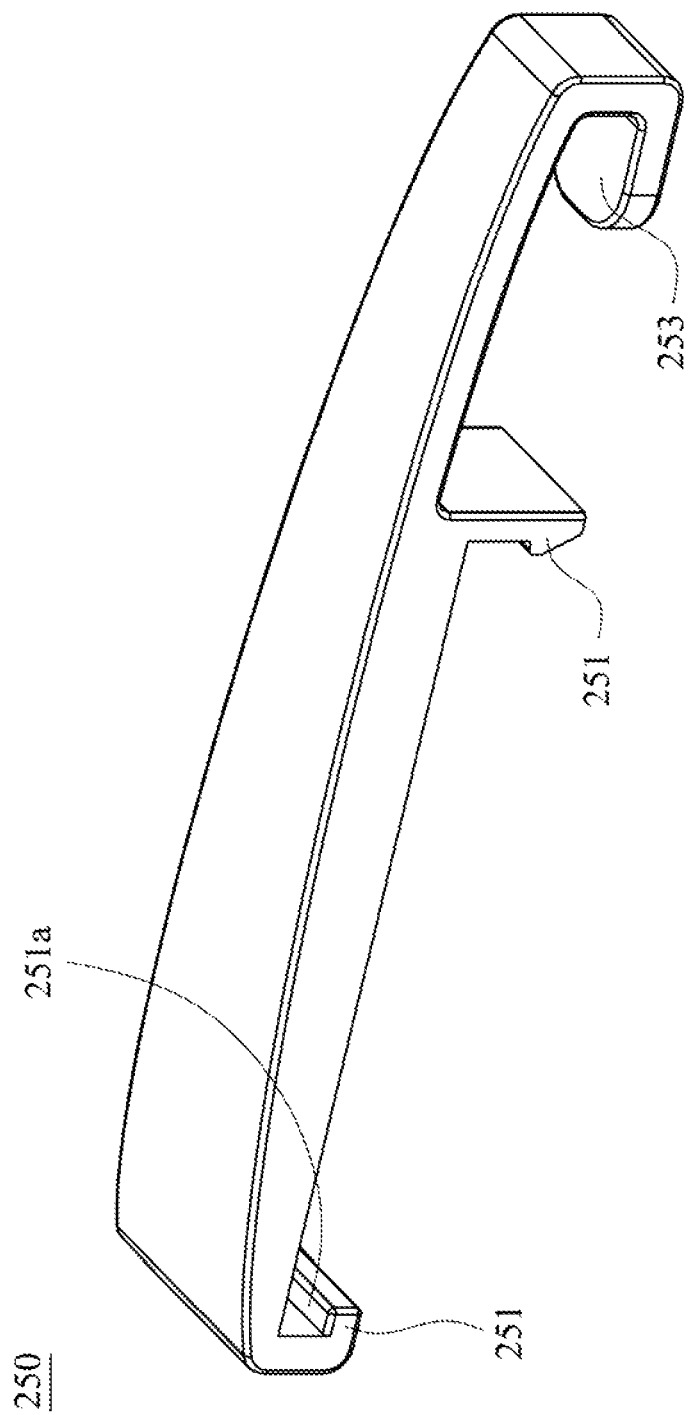
FIG. 9 is a schematic structural diagram showing a fastener in accordance with a sixth embodiment of the present invention.
Figure 10:
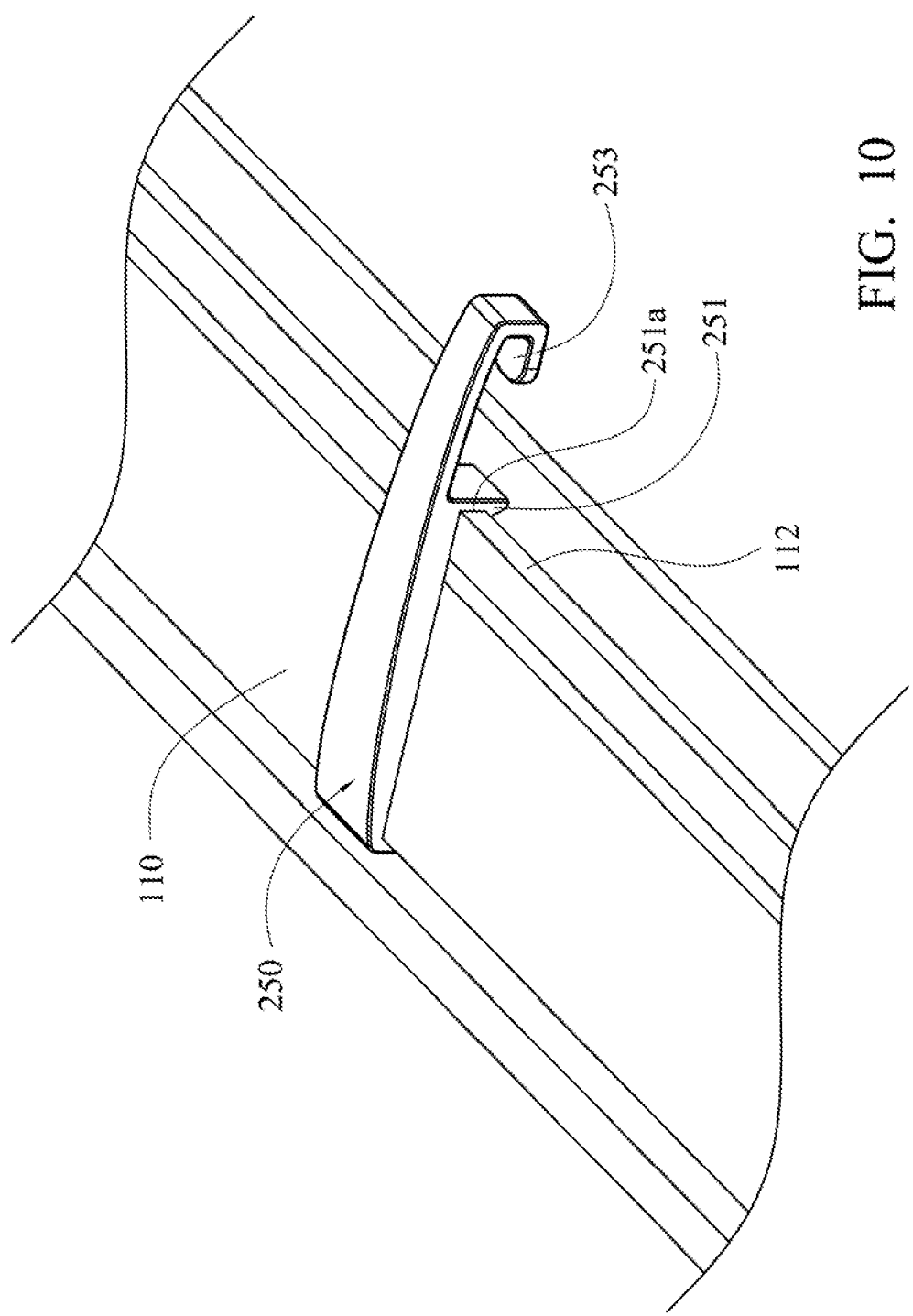
FIG. 10 schematic structural diagram showing the fastener engaged with a frame in accordance with the sixth embodiment of the present invention.

In the present invention, the fastener 230 may have a different design. Referring to FIG. 9 and FIG. 10, FIG. 9 is a schematic structural diagram showing a fastener 250 in accordance with a sixth embodiment of the present invention, and FIG. 10 is a schematic structural diagram showing the fastener 250 engaged with a frame in accordance with the sixth embodiment of the present invention. The structure of the fastener 250 shown in FIG. 9 is similar to that of the aforementioned fastener 230, and the main difference therebetween is that a connecting member 253 of the fastener 250 has a different structure design. As shown in FIG. 9, the fastener 250 mainly includes two opposite hook portions 251 and a connecting member 253. The hook portions 251 are corresponding to the extension structure 112 of the frame, and there is an engaging portion 251*a* located between the two hook portions 251. Therefore, fastener 250 can be fixed on the frame 110 by engaging the engaging portion 251*a* and the extension structure 112. As shown in FIG. 9 and FIG. 10, the connecting member 253 of the fastener 250 is a snap structure. Therefore, the aforementioned decorative unit, such as a rope, a plate, a hanging member, can be directly fixed on the connecting member 253 by suspending, hanging or screwing, etc.

Figure 11:
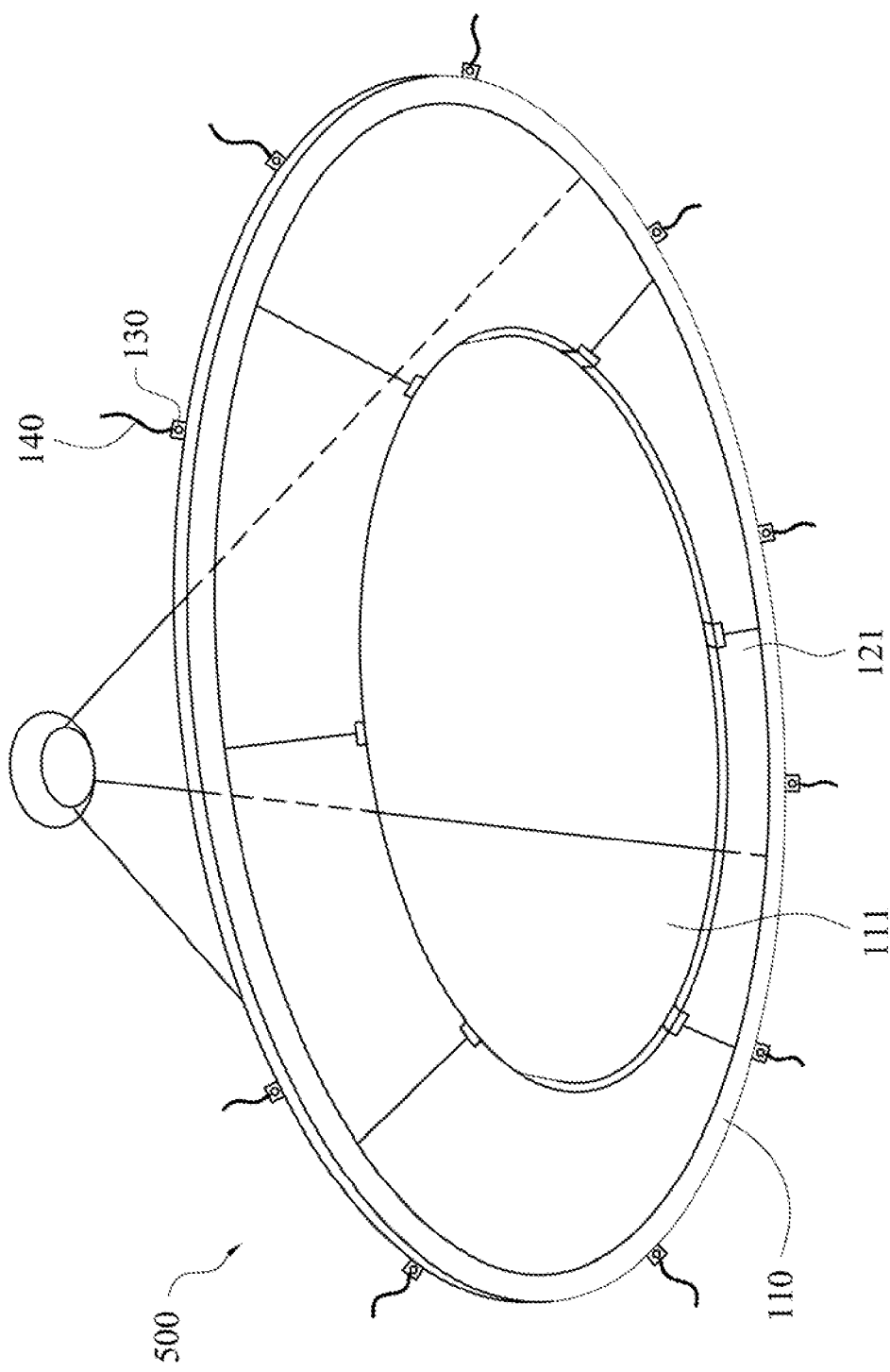
FIG. 11 is a schematic structural diagram showing a lamp in accordance with a seventh embodiment of the present invention.

In the present invention, the lamp 100 may have a different design. Simultaneously referring to FIG. 1, FIG. 2 and FIG. 11 FIG. 11 is a schematic structural diagram showing a lamp 500 in accordance with a seventh embodiment of the present invention. The structure of the lamp 500 is similar to that of the aforementioned lamp 100, and the main differences therebetween are that the light source 120 of the lamp 500 and the light guide unit 121 are disposed on the side of the frame 110 near the central hollow portion 111, and the fastener 130 is disposed on the side of the frame 110 away from the central hallow portion 111. In other words, the light guide unit 121 is disposed in the central hollow portion 111, and the light source 120 emits light towards the light guide unit 121. Moreover, the decorative units 140 are disposed on the outer side of the frame 110. In some embodiments, the decorative units 140 are ropes which can be hung on the frame 110. In other embodiments, the decorative units 140 disposed on the outer side of the frame 110 can be connected with other fasteners disposed on the frames of other lamps, so as to simultaneously connect and embellish plural lamps.

According to the aforementioned embodiments of the present invention, the lamp achieves an object of decoration by using the fastener to fix the decorative unit on the frame. In addition, the fastener can be elastically engaged with the frame through its elasticity, or the fastener can be tightly engaged with the frame by using the abutting member. Therefore, the fastener can be rapidly dismantled from the frame or the position of the fastener can be adjusted, so as to quickly change different decorative units to form the lamps with different styles.

According to the aforementioned embodiments of the present invention, the structure of the lamp is simple and can be easily assembled, such the lamp appearance can be varied to meet various requirements by users and increase added value of the lamps.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A lamp, comprising:
a frame;
a light source disposed on the frame;
a light guide unit having a light-incident surface and a light-emitting surface, wherein the light-incident surface faces towards the light source, and light emitted from the light source enters the light guide unit from the light-incident surface and is emitted out from the light-emitting surface to form a light plane; and
a decorative unit detachably disposed on a position different from the light plane.

2. The lamp of claim 1, further comprising at least one fastener engaged with the frame, wherein the fastener has a connecting member on which the decorative unit is fixed.

3. The lamp of claim 2, wherein
the frame has an extension structure; and
the fastener has an engaging portion which is elastically engaged with the extension structure.

4. The lamp of claim 2, wherein
the frame has an extension structure and a sidewall; and
the fastener further comprises a hook portion, an extending wall and an abutting member, wherein the hook portion and the extending wall are respectively located at two opposite sides of the fastener, and the hook portion is correspondingly engaged with the extension structure, and the abutting member passes through the extending wall and abuts against the sidewall of the frame.

5. The lamp of claim 2, wherein the connecting member comprises a rod and a positioning member, and the decorative unit is connected to the rod, and the positioning member is disposed on the rod to fix the decorative unit.

6. The lamp of claim 2, wherein the frame has a first side and a second side opposite to the first side, and the light source is disposed on one of the first side and the second side, and the fastener is disposed on the other one of the first side and the second side.

7. The lamp of claim 6, wherein the frame further has an accommodating space located at the first side, and the light source is disposed in the accommodating space.

8. The lamp of claim 7, wherein a side of the light guide unit near the light-incident surface is located in the accommodating space.

9. The lamp of claim 6, wherein the frame is art annular structure with a central hollow portion and the first side is adjacent to the central hollow portion, and the second side is located away from the central hollow portion, and the decorative unit is disposed in the central hollow portion.

10. The lamp of claim 9, wherein the frame further has an accommodating space located at the first side, and the light source is disposed in the accommodating space.

11. The lamp of claim 10, Wherein a side of the light guide unit near the light-incident surface is located in the accommodating space.

12. The lamp of claim 6, wherein the frame is an annular structure with a central hollow portion, and the first side is located away from the central hollow portion, and the second side is adjacent to the central hollow portion, and the light guide unit is disposed in the central hollow portion.

13. The lamp of claim 12, wherein the frame further has an accommodating space located at the first side, and the light source is disposed in the accommodating space.

14. The lamp of claim 13, Wherein a side of the light guide unit near the light-incident surface is located in the accommodating space.

15. The lamp of claim 1, wherein the light guide unit comprises a plurality of light guide plates which are mutually connected.

16. The lamp of claim 1, wherein a plurality of indicating portions are disposed on the frame.

17. A lamp, comprising:
a frame;
a light source disposed on the frame;
a light guide unit having a ht-incident surface and a light-emitting surface, wherein the light-incident surface faces towards the light source, and light emitted from the light source enters the light guide unit from the light-incident surface and is emitted out from the light-emitting surface; and
a decorative unit which is detachably disposed, wherein the material of the decorative unit is different from the material of the light guide unit.

18. A lamp, comprising:
a frame;
a light source disposed on the frame;
a light guide unit comprising a plurality of light guide plates mutually connected, wherein the light guide unit has a light-incident surface and a light-emitting surface, and light emitted from the light source enters the light guide unit from the light-incident surface and is emitted out from the light-emitting surface; and
a decorative unit which is detachably disposed on a position for maintaining a light-emitting feature of the lamp.

* * * * *